Patented July 21, 1953

2,646,416

UNITED STATES PATENT OFFICE 2,646,416

INHIBITION OF GELATION IN UNSATURATED POLYESTERS WITH SALTS OF AMINES

Earl E. Parker, Milwaukee, Wis., assignor to Pittsburgh Plate Glass Company, Allegheny County, Pa., a corporation of Pennsylvania No Drawing. Application October 20, 1950, Serial No. 191,307

19 Claims. (Cl. 260—45.4)

The present invention relates to stabilization of polymerizable esters of dihydric or other polyhydric alcohol esters of polycarboxylic acids which contain a polymerizable ethylenically unsaturated group, preferably in the alpha beta position and to stable compositions comprising such esters.

One object of the invention is to provide a polymerizable material of the foregoing type which is stabilized against premature gelation during relatively prolonged periods of storage.

A second object is to provide a material which is stable during extended periods of storage but which can readily be cured to a resinous state under appropriate conditions.

A third object is to provide a stabilized composition of the foregoing type which is highly resistant to gelation in the absence of peroxide catalysts of polymerization but which resinifies quickly at relatively low temperatures when a catalyst is added.

A fourth object is to provide such copolymerizable mixtures which will cure readily to provide relatively large castings which are sound and of good color.

These and other objects will be apparent from consideration of the following specification and the appended claims.

It has heretofore been recognized that linear polyesters of dihydric alcohols and an ethylenically unsaturated dicarboxylic acid in which the carboxylic groups are linked to one or both of the ethylenic carbon atoms, (including mixed esters of such ethylenically unsaturated dicarboxylic acids and other dicarboxylic acids) are capable of polymerization by addition reaction between the ethylenic groups of the polyester to form thermoset products. This type of material is widely disclosed, for example in U. S. Letters Patent Nos. 2,409,633 and 2,443,735 to 2,443,741 inclusive, granted to Kropa or U. S. Letters Patent 2,450,552 granted to Hurdis.

It has also been suggested to admix liquid, or at least fusible linear polyesters such as are disclosed in the foregoing patents, with ethylenically unsaturated monomers and copolymerize the two by heating the mixture in the presence of a peroxide catalyst. This reaction has been extensively elaborated upon in the above patents as well as in numerous other patents and publications. Typical examples of publications are to be found in Industrial and Engineering Chemistry, December 1939, page 1512 and January 1940, page 64.

The foregoing polymerizable compositions undergo addition reaction, that is reaction at the points of carbon-carbon unsaturation, even in the absence of polymerization catalysts and at room temperature or thereabouts. This is especially true in the case of copolymerizable mixtures of the polyesters and the ethylenically, or vinylically unsaturated monomers. A polyester of maleic or fumaric acid and a glycol such as propylene glycol or diethylene glycol, in the presence of a vinylic monomer such as styrene, unless inhibited, will begin to gel almost at once. This is true even in the absence of polymerization catalysts and at room temperature. A catalyst may be desirable to obtain complete cure of such mixture in a reasonable time, but nonetheless, polymerization will quickly proceed so far in the uncatalyzed mixtures as to prevent or at least interfere with normal casting or laminating operations.

This strong tendency of the copolymerizable mixtures to set prematurely was early recognized (see Ellis Patent 2,255,313). In the patent, it is proposed to improve this property by incorporating a cellulose as a filler. This, of course, greatly restricts the field of application of the mixtures.

It has further been proposed to improve the storage characteristics of the copolymerizable mixtures by adding small amounts of stabilizers such as phenolic compounds, e. g. hydroquinone. U. S. Patent 2,409,633 contains such suggestion. However, for many applications, the phenolic compounds were poor inhibitors of gelation. They often continued to inhibit the polymerization even when the catalyst was added and the mixture was heated. Therefore, they unduly slowed up the reaction and necessitated unduly high curing temperatures. This was objectionable in making castings. Some inhibitors also tended to discolor the resins, a feature highly objectionable in the casting art. Castings of substantial size also tended strongly to crack or break in the curing operations.

According to the present invention, a novel stable resinifiable composition which is highly stable in storage, but which will cure readily without substantial discoloration or cracking, has been provided. Such composition comprises a polyester of a dihydric alcohol and an ethylenically unsaturated dicarboxylic acid stabilized by a soluble amine salt which when dissolved in water forms a solution of a pH of substantially 7 or below in which such salts may be regarded as derivatives of ammonium salts in which 1 to 3 hydrogen atoms directly attached to the ammonium nitrogen are replaced by an organic radical or radicals. In accordance with this invention it has been found that such amine salts are excellent gelation inhibitors or stabilizers for polyesters of the foregoing type or for mixtures of such polyesters and vinylic monomers. These salts are of the type resulting from reaction of a primary, secondary or tertiary amine with an acid.

The polymerizable mixtures

The polymerizable mixtures to be stabilized under the provisions of the present invention are now conventional in the art. The foregoing patents and articles in Industrial and Engineering Chemistry are illustrative of the fact. These prior art references are herewith incorporated as a part of this disclosure.

The ethylenically unsaturated dicarboxylic acid

It is apparent that an appropriate ethylenic unsaturated dibasic acid for use in the preparation of an ethylenically unsaturated polyester may comprise a large class. Some of them, designated as component A, are tabulated as follows:

TABLE A

1. Maleic acid
2. Fumaric acid
3. Aconitic acid
4. Mesaconic acid
5. Citraconic acid
6. Ethyl maleic acid
7. Pyrocinchoninic acid
8. Xeronic acid
9. Itaconic acid
10. Carbic acid The chlorine substituted derivatives of the acids, e. g. chloromaleic acid, are also contemplated.

The anhydrides of these acids, where the anhydrides exist, are, of course, embraced under the term "acid," since the reaction products or polyesters are the same. Often it is preferable to operate with the anhydride rather than the free acid. All of these acids are di- or tricarboxylic. Most of them include an ethylenic group in $\alpha$ relation to at least one carboxyl. That is, they include the group

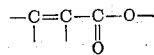

The acids (or anhydrides) which are $\alpha\beta$ ethylenic $\alpha\beta$ dicarboxylic are especially desirable.

The dihydric alcohols

The dihydric alcohols termed component (B) of the polyester embrace such compounds as are included in the following table:

TABLE B

1. Ethylene glycol
2. Diethylene glycol
3. Triethylene glycol
4. Polyethylene glycol
5. 1,3 propylene glycol
6. 1,2 propylene glycol
7. Dipropylene (1,3 or 1,2) glycol
8. Butylene glycol
9. Styrene glycol Halogen substituted glycols, e. g. mono-chlor derivatives are contemplated.

The saturated dicarboxylic acids

It is to be understood that in addition to stabilization of unmixed esters the invention contemplates the stabilization of mixed polyesters of dicarboxylic acids in which the polyester molecule is of both an ethylenically unsaturated dicarboxylic acid and a dicarboxylic acid free of any unsaturation adapted to react by addition with ethylenic groups. The principal functioning groups in these non-ethylenic acids are carboxyls that react by esterification. Such acids in the polyester add to the length of the polyester molecules but they do not cross link the polyester molecules at points intermediate their ends by addition with the monomer. Often such non-ethylenic dicarboxylic acids improve the properties of the resins in which they are introduced. In most instances the mixed polyesters are preferred.

Examples of appropriate dicarboxylic or tricarboxylic acids of the second class are tabulated as follows:

TABLE C

1. Phthalic acid
2. Tetrachlorophthalic acid
3. Succinic acid
4. Adipic acid
5. Suberic acid
6. Azelaic acid
7. Sebacic acid
8. Dimethyl succinic acid
9. Chlorinated derivatives of the above acids, 1, 3–8 inclusive For purposes of the present invention, the aromatic nuclei of such acids as phthalic are regarded as saturated since the double bonds do not react by addition as do ethylenic groups. The term "acid" also contemplates the anhydrides of the acids. Mixtures of any two of the acids 1 to 9 are contemplated.

Naturally some of the members of Tables A, B and C are preferable to others. For example, some of them may presently be unduly expensive, but since this condition is often subject to change, they are properly to be included.

Monobasic acid component

It may also be desirable to include a small amount of a drying oil acid or other monocarboxylic acid in the polyester. Drying oil acids impart air drying characteristics to the polyester, or the mixture of the polyester and the vinylic monomer. Appropriate acids termed acid D include those of the following table:

TABLE D

1. Linolenic acid
2. Linoleic acid
3. Elaeostearic acid
4. Octadecatrienoic acid
5. Clupanodonic acid
6. Acetic or propionic acid Mixtures of these acids are contemplated. In addition to or in lieu of the above, monohydric alcohols including ethyl, propyl, allyl or like alcohol may be incorporated in the polyester.

Preparation of the polyester

In the preparation of the polyesters, the dihydric alcohols of Table B which preferably contain no more than 10 carbon atoms are usually employed in approximate molar equivalency or slightly in excess of such equivalency of the sum of the acids of Tables A, C and D. Usually, this excess will not much exceed 10 or 20% and it may be lower. The excess glycol facilitates reduction of the acid number of the polyester.

The ethylenically unsaturated dicarboxylic acid may constitute the whole of the acid component of the polyester, but usually it is preferred to include at least some of one or more of the non-ethylenic acids from Table C. The amount of acid or acids from the latter table is capable of variation over a broad range. The minimum is, of course, none at all, and the maximum may be 10 or 12 mols per mol of the acid from Table A. Naturally, as the percentage of the acid from Table C is reduced, the polyester assumes more and more closely the character of the polyester containing only acid or acids from Table A. It is impossible to state an absolute minimum to the effective amount of acid from Table C. Amounts at least as low as ⅕ mol per mol of the first mentioned acids are suggested.

A component from Table D is also optional, dependent upon whether an air drying polyester is desired. A range of one mol of acid D to 2 to 12 mols of acids A or A and C is suggested.

Appropriate ranges of the several components of the polyester may be tabulated as follows:

Component:
(A) Ethylenic dicarboxylic acid, 2 to 12 mols.
(C) Non-ethylenically unsaturated dicarboxylic optional, but if present, ⅖ to 144 mols.
(D) Drying oil acid optional, but if present, 1 mol per 2 to 12 mols A+C.
(B) Dihydric alcohol, equivalent or in slight excess of A+C+D.

*Conditions of reaction in preparing polyester*

In conducting the esterification of the dihydric alcohol and the acid or acids, conventional principles are adhered to. Acid catalysts may be added. The reaction may be conducted under an atmosphere of carbon dioxide or nitrogen gas. Xylene or other non-reactive solvent may be included and the reaction may be conducted by heating the mixture to reaction temperature, e. g. to that at which water is expelled from the system. It is continued until water ceases to evolve and the acid value of a sample is reasonably low, e. g. 5 to 50. It should not be continued so long as to result in infusibility of the polyester. Usually a temperature of 150 to 190 or 200° C. and a reaction time of 2 to 20 hours is sufficient to effect the esterification.

*Stabilizing the polyester composition*

It is usually desirable to add the ammonium type amine salt to the polyester in the absence of monomer. If monomer is to be added it can be incorporated with the previously stabilized polyester. To this end, the amine salt is conveniently added to the polyester while it is warm. It will then dissolve immediately and will arrest any tendency of the batch to gel as it cools down. An appropriate temperature at which to make the addition of the salt is about 150° C. though, of course, it could be lower. It could also be higher so long as the inhibitor salt is not decomposed.

The inhibitor component includes any of the common soluble salts of primary, secondary and tertiary amines which are either neutral or have an acid reaction. Such salts include the chlorides, bromides, iodides, sulfates and phosphates as well as the carboxylic acid salts such as formic acid salts, acetic acid salts, propionic acid salts, butyric acid salts, succinic acid salts, maleic acid salts and salts of other acids capable of reacting with the primary, secondary or tertiary amine molecule to form salts and where the nitrogen of the amine becomes pentavalent. It is desirable that the salt be reasonably soluble in the mixture to be stabilized. Preferably strongly oxidizing acids, such as nitric acid, are excluded. The tertiary amine salts usually are embraced by the general formula:

where X is the acid radical of an acid at least as strong as acetic acid and having the oxidizing power not greater than that of sulphuric acid, and where $R_1$, $R_2$ and $R_3$ are the radicals of the amine

Most advantageously the group $R_1$ is a hydrocarbon group containing 1 to 18 carbon atoms and being alkyl in a normal or branched chain, e. g. ethyl, methyl, propyl, butyl, amyl, hexyl or cetyl or aryl or aralkyl, e. g. phenyl, benzyl, alpha naphthyl or beta naphthyl, etc. The invention also includes the use of salts of substituted amines in which the radical $R_1$ is a substituted hydrocarbon radical containing one or more chlorine, bromine, iodine, acyl, carbonyl or the like substituents in the chain. $R_2$ and $R_3$ may be from the same family as $R_1$ or one or both may be hydrogen. Groups $R_1$ or $R_2$ may be joined to each other in a ring structure, for example as represented by the formula:

where X is the acid radical or group. $R_2$ and $R_3$ may be combined in a common ring-like radical or a chain $(CH_2)_n$ where $n$ is a whole number, e. g. 4 or 5. $R_1$ can be a separate radical or the N atom can be doubly bonded to $R_3$.

While the structures of the compounds correspond to that resulting from reaction of a primary or secondary or tertiary amine with an acid to form an ammonium salt, the mode of forming these salts is not a part of the invention. The invention contemplates the use of the salts as stabilizers in the polymerizable materials herein disclosed, regardless of the techniques employed in preparing the salts. Often the reaction may not involve the interaction of acids and amines. For example, an alkyl halide may be reacted with ammonia to form a salt. Such reaction might be represented by the equation:

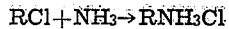

where R is alkyl, e. g. ethyl or methyl.

In the formulae the organic groups $R_1$, $R_2$ and $R_3$ may be of a single kind or they may be mixed. All of them may be hydrocarbon such as alkyl, alkenyl or alkynyl, e. g. ethyl, methyl, propyl, isopropyl, n-butyl, secondary butyl, tertiary butyl, vinyl and methallyl. A part may be aryl or aralkyl, e. g. phenyl, benzyl, etc. Moreover, groups $R_1$, $R_2$, and $R_3$ may be oleyl, stearyl, methoxy or methoxy benzyl.

Some of the possibilities for the several groups $R_1$, $R_2$ and $R_3$ are tabulated as follows:

TABLE E

|    | $R_1$ | $R_2$ | $R_3$ |
|---|---|---|---|
| 1 | Methyl | Methyl | Methyl. |
| 2 | Ethyl | Ethyl | Ethyl. |
| 3 | Propyl | Propyl | Propyl. |
| 4 | Isopropyl | Isopropyl | Isopropyl. |
| 5 | n-Butyl | n-Butyl | n-Butyl. |
| 6 | Sec. butyl | Sec. butyl | Sec. butyl. |
| 7 | Tert. butyl | Tert. butyl | Tert. butyl. |
| 8 | Amyl | Amyl | Amyl. |
| 9 | Octyl | Octyl | Octyl. |
| 10 | Phenyl | Alkyl | Alkyl. |
| 11 | Tolyl | do | Do. |
| 12 | Benzyl | Benzyl | Benzyl. |
| 13 | Chlorobenzyl | Chlorobenzyl | Chlorobenzyl. |
| 14 | Cetyl | Cetyl | Cetyl. |
| 15 | Octadecyl | Octadecyl | Octadecyl. |
| 16 | Chloromethyl | Chloromethyl | Chloromethyl. |
| 17 | Methoxymethyl | Methoxymethyl | Methoxymethyl. |

It is to be understood that the various possible combinations of the groups 1 through 17 in the several positions $R_1$, $R_2$ and $R_3$ are contemplated. That is, the compounds may be homogeneous or so mixed as to include any combination of the above groups desired.

As stated previously, halogenated alkyl, aryl or aralkyl groups are contemplated. For example, the hydrocarbons of 1 through 14 may contain 1, 2 or more chlorine or bromine atoms.

In some instances, as previously indicated, it will be apparent that two of the groups R are joined or interconnected in a ring structure. This is represented by the piperidinium salts. Salts of the formula:

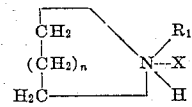

where $n$ is a whole number, e. g. 2 or 3, and $R_1$ and X are as above defined, and also belong in a class represented by Table E.

It is also further to be appreciated, as previously stated, that a plurality of ammonium groups may share a common hydrocarbon radical. Such compound is represented by ethylene bis(pyridinium chloride) and ethylene bis(dimethyl ammonium bromide).

The presence of non-functioning substituents such as one or more chlorine or bromine atoms in the hydrocarbon radicals in positions $R_1$, $R_2$, $R_3$ is not precluded.

*The acid component of the salt*

As previously stated, the acid component of the salt of the amine may be selected from a relatively wide range of acids. For example, the radical X may be Cl, Br, I,

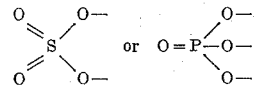

These latter two salts may be acid or neutral salts. The acid may also be organic as previously indicated, that is, the radical of the acid will be of the approximate formula:

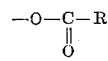

where R is a hydrocarbon group such as alkyl or the remainder of the molecule in a dicarboxylic acid such as succinic, maleic or fumaric acid. Of course, R may also be a halogen substituted hydrocarbon such as trichloromethyl, mono-, di-chloro- or bromo- ethyl, propyl or the like. The inhibitors, as indicated, can be regarded as salts of acids and amines.

The following table is of examples of acids which may be appropriately reacted with amines such as primary, secondary or tertiary amines to provide ammonium salts within the purview of the present invention:

TABLE F

1. Acetic
2. Succinic
3. Sulfuric
4. Phosphoric
5. Hydrochloric
6. Hydrobromic
7. Chloroacetic
8. Malonic
9. Hydriodic
10. Maleic acid
11. Trichloro acetic In the acid component of the salt, whose negative radical is represented by the group X, the latter group should be at least as strongly negative as acetic acid, i. e. should have a dissociation constant of at least $1.75 \times 10^{-5}$ and should not involve heavy radicals or groups that would reduce its negative character or unduly impair its mobility in the mixture. The use of excessively heavy organic acids to form the salts may also unduly increase the amount of salt required to attain stability. Organic acids employed preferably are of a weight not much above 200. The salts of the strong non-oxidizing mineral acids usually are the most satisfactory. The acid organic substitution products such as the acid sulfates, sulfonates and phosphonates of these acids are also contemplated.

*The amino component of the ammonium salt*

The following constitute representative examples of amines which can be reacted with acids such as any of those selected from Table F to provide soluble ammonium salts adapted for use as inhibitors of gelation under the provisions of the present invention:

TABLE G

1. Diethyl aniline
2. Dimethyl aniline
3. Trimethyl amine
4. Triethyl amine
5. Tripropyl amine
6. Tributyl amine
7. Triamyl amine
8. Trihexyl amine
9. Diethyl amine
10. Dipropyl amine
11. Dibutyl amine
12. Diamyl amine
13. Dibenzyl amine
14. Tribenzyl amine
15. Pyridine
16. α Naphthyl amine
17. N,N'Dicyclohexyl piperazine
18. Piperidine The following are representative examples of salts of the amines which may be employed:

TABLE H

1. Trimethylamine hydrochloride
2. Trimethylamine hydrobromide
3. Trimethylamine hydroiodide
4. Dimethylaniline hydrochloride
5. Dimethylaniline hydrobromide
6. Triethylamine hydrochloride 7. Tri-n-butylamine hydrochloride
8. Tribenzylamine hydrochloride
9. Tribenzylamine hydrobromide
10. N Benzylaniline hydrochloride
11. Benzyl methylamine hydrochloride It is desirable that these salts be soluble in or compatible with the polyester or mixture of polyester and monomer to be stabilized.

*Dissolving ammonium salts in polyester*

Salts of amines can be dissolved in polyesters of ethylenic dicarboxylic acids and dihydric alcohols (or their derivatives as modified by dicarboxylic acids and/or drying oil acids) to provide products that can be stored for very long periods without fear of gelation. The stabilizers are preferably added to the polyester while the latter is hot, e. g. 100 or 150° C.

A curing catalyst, e. g. benzoyl peroxide, tertiary butyl hydroperoxide, cyclohexyl hydroperoxide, acetyl peroxide, lauroyl peroxide, or the like can be added to the stabilized mixture in appropriate amount (.01 to 5% by weight) at any time. The mixture when heated will cure rapidly and completely with but little interference from the inhibitor.

*Copolymerizable mixtures of polyesters and ethylenically unsaturated polymerizable compounds*

The copolymerizable mixtures of the polyesters and ethylenically unsaturated polymerizable compounds are, of course, frequently more reactive than the polyesters per se, and the stabilization of these mixtures is usually more urgent than that of the polyester. Such copolymerizable mixture may comprise any of the polyesters which have already been described and these may be incorporated with a suitable vinylically unsaturated monomer such as those referred to in the foregoing patents.

*The ethylenic compounds*

The ethylenic compounds comprise any of the common ethylenic compounds capable of copolymerizing with the unsaturated polyester. Preferably such compounds are liquids and usually they contain the reactive group $H_2C=C<$ linked to a polar group. Generally they are used in the monomeric or syrupy polymer state. The following include some of these compounds:

TABLE I

1. Styrene
2. α Methyl styrene
3. p-Methyl styrene
4. Divinyl benzene
5. Indene
   Unsaturated esters such as:
6. Vinyl acetate
7. Methyl methacrylate
8. Methyl acrylate
9. Allyl acetate
10. Diallyl pthalate
11. Diallyl succinate
12. Diallyl adipate
13. Diallyl sebacate
14. Diethylene glycol bis (allyl carbonate)
15. Triallyl phosphate
16. Esters such as those of monohydric or polyhydric alcohols (methyl, ethyl, propyl, allyl, methallyl, vinyl) and an unsaturated polymerizable monocarboxylic acid (acrylic, methacrylic, chloroacrylic)
17. Esters of monohydric unsaturated alcohols (allyl, vinyl, methallyl, crotyl) and mono or polycarboxylic acids (acetic, propionic, succinic, etc.)
18. Esters of αβ unsaturated dicarboxylic acids (maleic, fumaric, itaconic) and monohydric alcohols (methyl, ethyl, propyl, isopropyl, amyl)

Any one of these vinylic monomers (including syrupy mixtures of monomer and polymer) may be combined with any of the polyesters prepared from components A and B, A, B and C, A, B and D or A, B, C and D as previously described.

Mixtures of any two or more of the foregoing vinylic compounds and the polyesters are contemplated.

The vinylic monomer usually will comprise from 10 to 60% upon a weight basis of the copolymerizable mixture and mixtures containing 20 to 40 or 50% by weight of monomer are to be preferred.

To formulate stabilized or non-gelling mixtures of (I) an unsaturated polyester of a dihydric alcohol and an acid comprising a dicarboxylic ethylenically unsaturated acid and (II) a vinylic monomer, it is preferred to dissolve a salt of an amine (for example one of those listed in Table II) as an inhibitor in the polyester component. This is best accomplished by adding the salt to the polyester while the latter is hot, e. g. about 150° C. or to such other temperature as will effect rapid and complete solution. This can be determined by observation, as it is easy to see when all of the salt has disappeared into the polyester. The ammonium salt may be added in any stabilizing amount, for example about .01 to 2% by weight of the ultimate mixture of the polymerizable components. This is essentially the same procedure as is employed to stabilize the polyester without monomer.

The ethylenic compound such as one of those from Table I may be added in appropriate amount, e. g. 10 to 60% by weight of the monomer-stabilized polyester mixture, and at 120° C. or lower temperatures.

The above method is particularly valuable when styrene is used as the vinylic monomer since the mixture tends to polymerize upon formation unless stabilized. With less active vinylic monomers the inhibitor may be added to the monomer before mixing if desired. The resultant mixtures are stable in storage for long periods of time and have been observed to be stable for a period of at least three years, which is generally much better stability than is required.

However, when the mixtures are to be cured, a peroxide catalyst such as benzoyl peroxide or tertiary butyl hydroperoxide or others in conventional amounts, e. g. .1 to 5%, can be easily incorporated therein and the mixture may be readily cured. The temperature of cure can be moderate, e. g. below 100° C., but may be much lower, e. g. room temperature (22° C.) or thereabouts. The resins may be further hardened by baking them at 125 to 150° C. or thereabouts. Higher temperatures of initial curing and baking are permissible. However, they should not be so high as to volatilize the monomer (in initial cure) or to char or discolor the final product. The time of curing and baking, of course, will vary greatly depending upon such factors as the size and thickness of the body to be formed and the temperature of reaction. Usually 5 minutes to 2 hours is sufficient. However, it is easy to determine by hardness tests when the articles are cured to hard, clear state.

It is an important feature of the use of the ammonium salts of amines herein disclosed as inhibitors of gelation, that although they are very effective in periods of storage of the uncatalyzed mixture, the catalyzed mixtures cure very readily and completely at low temperatures and initiation of polymerization by peroxide catalysts is not seriously impeded by these inhibitors. Where the mixture is employed to embed delicate objects such as insects, biological specimens or the like, cure can be effected without damaging them. Also, in making castings in molds of latex or the like, the low curing temperature is desirable to avoid damage to the molds and production of fractured or impaired castings.

Thus, it is also a property of the salts that they do not discolor the product in which they are employed. Furthermore, castings formed from copolymerizable mixtures are sound and free of cracks. Products in which conventional inhibitors are employed during storage often are cracked or broken. This is especially true in the case of relatively massive castings.

It is to be understood that while the ammonium or amine salts herein disclosed, taken by themselves, are excellent gelation inhibitors for copolymerizable mixtures of unsaturated polyesters and vinylic monomers, other inhibitors, such as those of conventional type, such as quinone, can also be included along with the salts. These may be employed, for example, in a proportion of approximately 1% by weight based upon the weight of the salt or such other proportion as is expedient. Such additional inhibitors sometimes are helpful where the time and temperature of the cure is relatively unimportant and where it is desirable to increase the so-called "tank life" of the mixture, that is, to increase the period in which catalyzed mixtures can be stored without gelation.

It is understood that such vinylic monomers as styrene, as sold commercially, normally contain small amounts of inhibitors to admit of storage and shipment thereof without gelation or polymerization. Commercial monomers containing such inhibitors, e. g. quinone or hydroquinone, in small amounts can be employed in the present process. Obviously, the inhibitor in the monomer is greatly diluted when the latter is incorporated with a polyester under the provisions of the present invention. Also, in many instances, the effectiveness of the added inhibitor carried in the monomer has been greatly reduced by the period of storage which the monomer has undergone before it is admixed with the polyester. Normally the inhibiting effect of the stabilizer in the monomer will not be objectionably great. However, if so desired, the inhibitor of commercial styrene or other monomer can be eliminated before the monomer is incorporated with a polyester containing an ammonium salt as an inhibitor.

While the use of the salts of primary and secondary amines is not precluded from the purview of the invention, it is usually preferred to employ the salts of the tertiary amines, such as trimethyl amine hydrochloride or dimethyl aniline hydrochloride or similar salts of tertiary amines. These salts, of course, should be soluble in the composition in the concentrations used.

The components of the stabilized copolymerizable mixtures of monomer and unsaturated polyester preferably will be within the following proportions:

| | Parts by weight |
|---|---|
| Vinylic monomer | 10 to 60 |
| Unsaturated polyester | 40 to 90 |
| Salt of amine | .01 to 2 |

The following examples are illustrative:

Example I

A mixed polyester was prepared by reacting propylene glycol and a mixture of maleic acid and phthalic acid in equal molecular proportions with respect to each other in the proportion of approximately one mol of glycol per mol of acid. Two parts by weight of this mixture was combined with 1 part by weight of styrene. Samples of the mixture were stabilized with salts of amines and the stabilized mixtures were subjected to an accelerated gelling test at 150° F. The results of these tests are tabulated as follows, percentages in the table being based upon the weight of the polyesterstyrene mixture.

| Inhibitor | Amount, Percent by wt. | Minimum Days, stability |
|---|---|---|
| Triamyl amine hydrochloride | .5 | 4 |
| Pyridine hydrochloride | 1.0 | 12 |
| Alpha naphthyl amine hydrochloride | 1.0 | 27 |
| Diethyl amine hydrochloride | 1.0 | 21 |

This constitutes a severe test; at like temperatures, the mixtures without inhibitors gel upon mixing.

Example II

Diethylene fumarate adipate which was a polyester of equal mols of fumaric acid and adipic acid with diethylene glycol in approximately stoichiometric proportion to react with these acids was prepared and a stabilized mixture thereof with a monomer was formulated as follows:

| | Parts by weight |
|---|---|
| Diethylene fumarate adipate | 2 |
| Diethylene glycol bis(allyl carbonate) | 1 |
| Trimethyl amine hydrochloride | 0.015 |

This mixture was stable for more than 50 days at 150° F. The control comprising a similar mixture except for the omission of the gelation inhibitor gelled in one day at a like temperature.

Example III

Propylene adipate fumarate which comprised a mixed polyester of propylene glycol and equal mols of adipic acid and fumaric acid was prepared. This polyester can be stabilized with trimethyl amine hydrochloride in small stabilizing amount to provide a very stable polyester product. A copolymerizable mixture of good stability was prepared from the polyester by formulation as follows:

| | Parts by weight |
|---|---|
| Propylene adipate fumarate | 2 |
| Diallyl phthalate | 1 |
| Trimethyl amine hydrochloride | 0.015 |

This mixture was stable for more than 50 days at 150° F. The mixture without the stabilizer or inhibitor gelled in less than one day.

Example IV

In this example, propylene adipate fumarate prepared in accordance with Example III was stabilized with trimethyl amine hydrochloride. The mixture was a good and stable polyester which can be cured to form a resinous product by the addition of an appropriate peroxide catalyst and subsequent heating to reaction temperature. A copolymerizable mixture of the following composition was prepared from the stabilized polyester:

| | Parts by weight |
|---|---|
| Propylene fumarate adipate | 2 |
| Vinyl acetate | 1 |
| Trimethyl amine hydrochloride | 0.015 |

The resultant copolymerizable mixture was stable for more than 50 days at 150° F. and for 180 days at 70° F. The stabilized mixture could be catalyzed with benzoyl peroxide or other peroxide catalyst, for example in amount of .01 to 5% by weight. The catalyzed mixture would gel at 25 to 50° C. and would cure readily when heated, for example, to a temperature of 75 to 200° C.

*Example V*

A propylene adipate fumarate polyester prepared as previously described was stabilized, again with trimethyl amine hydrochloride, to provide a polyester that can be admixed with peroxide catalysts and then cured at will. It was formulated with methyl methacrylate to provide a copolymerizable mixture of the composition:

| | Parts by weight |
|---|---|
| Propylene adipate fumarate | 2 |
| Methyl methacrylate | 1 |
| Trimethyl amine hydrochloride | 0.015 |

The resultant copolymerizable mixture was stable for 19 days at 150° F. and 90 days at 70° F.

In any of the examples, I through V inclusive, it is to be understood that the polyesters of maleic or fumaric acid and a glycol such as propylene glycol or diethylene glycol could be substituted for the mixed polyesters. Likewise, any of the monomers from Table I could be substituted for the monomers listed in the examples. Also, any of the ammonium salts from Table II could be substituted for the trimethyl amine hydrochloride or the other ammonium salts listed in the examples.

It is to be appreciated that in order to effect a rapid cure of the mixture of polyester and the olefinically unsaturated monomer, a catalyst of the addition reaction involved in copolymerization is usually desirable. However, in some instances, e. g. where high curing temperatures or long curing times, or ultra-violet irradiation are available, catalysts may be omitted.

Appropriate catalysts include:

Benzoyl peroxide
Tertiary butyl hydroperoxide
Cyclohexyl hydroperoxide
Acetyl peroxide
Lauroyl peroxide These are merely typical, others are available. The catalysts will usually be employed within a range of .01 to 5%, e. g. 1% of the mixture. Preferably the catalyst is added shortly before the mixture is to be polymerized.

Other types of catalysts such as are employed as accelerators of rubber vulcanization or as rubber preservatives, obtained by condensation of amines and aldehydes, e. g. formaldehyde or acetaldehyde or butyraldehyde and aniline and toluidine may be employed. Many of these are described in The Chemistry of Synthetic Resins, vol. I, pages 704–711, Carelton Ellis, copyrighted 1935, Reinhold Publishing Corporation. Mixtures of the two types of catalyst, e. g. 1% of benzoyl peroxide or tertiary hydroperoxide, may be employed.

In order to promote the polymerization of a mixture such as above described, a catalyst, e. g. benzoyl peroxide or any of the others in an amount of .1 to 5% is added and the mixture is heated up to an appropriate temperature, for example, to about 93° C. Lower temperatures, say 75° C., may also be employed. By heating at this latter temperature for a period of about an hour, the resin can be polymerized to the setting stage. Subsequently, it can be rendered harder and more durable by baking at a temperature of about 125 to 200° C. Of course, higher temperatures of baking can be employed, provided they are not so high as to char or discolor the product. The products normally will be clear and strong. The polymerizable mixtures may be cast and cured in suitable molds with or without pressure.

Fillers such as cellulose fibers, asbestos and glass fibers can be added to the polymerizable mixtures in amounts, for example, up to 300% or more based upon the polymerizable liquids. Fabrics of glass fibers can also be impregnated or coated with the polymerizable mixtures. Mixtures of fibrous material and resin constituents can be heated under pressure to form hard, strong bodies of appropriate form.

Plasticizers such as dimethyl phthalate can also be added to the polymerizable mixtures in amounts, for example, of 5 to 40% based upon polymerizable constituents.

The polymerizable mixtuers can be applied as coatings to metal, wood, paper, cotton or other cloth and cured in situ to for protective films.

A series of compartive tests were preformed designed to show the effects of ammonium salts of amines as herein described in copolymerizable mixtures of unsaturated polyesters. In these tests, a standard copolymerizable mixture of 1 part by weight of styrene and 2 parts by weight of a mixed polyester of 2.2 mols of 1,2 propylene glycol and a mixture of 1 mol of maleic acid and 1 mol of phthalic acid was employed. The copolymerizable mixture included the several stabilizers or gelation inhibitors to be tested. The stabilized mixtures were subjected to five standardized tests designated respectively as A, B, C, D and E.

In the first of these tests (A), a two ounce sample of the uncatalyzed copolymerizable mixture and the described amount of inhibitor was subjected to an accelerated gelation test in an oven at a constant temperature of 150° F. and the mixture was examined daily to determine when gelation occurred.

In the second test (B), about two ounces of the copolymerizable mixture was admixed with 1.5% by weight of benzoyl peroxide as a polymerization catalyst. This mixture was also observed to determine when gelation occurred.

In a third test designated (C), a two ounce sample of the copolymerizable mixture was combined with .1% by weight of tertiary butyl hydroperoxide as a polymerization catalyst.

In a fourth test designated as (D), a two ounce sample of copolymerizable mixture which contained the desired stabilizer was admixed with .5% by weight of tertiary butyl hydroperoxide.

The samples for tests B, C and D were stored in a constant temperature room at 77° F. and they were observed frequently for gelation.

In a fifth test (E), the rate of cure of the copolymerizable mixtures was determined by a standardized procedure in which the time required for the samples in curing to reach their so-called peak of their exothermal rise was determined. This procedure was as follows:

An 11 to 12 gram sample of the copolymerizable mixture was admixed with 1.5% of benzoyl peroxide as a polymerization catalyst. The catalyzed mixture was introduced into a test tube 16 millimeters in diameter, to a depth of about 3 inches. A conventional thermocouple which was connected up to a recording Brown "Electronik" potentiometer, was inserted at the center of the tube to a depth of about one inch above the bottom. The tube was then inserted in a water bath at 180° F. and the recording apparatus was started. The temperature rose to that of the bath, but by reason of the exothermal reaction of polymerization, it ultimately continued to rise to a maximum, termed the "Peak Exotherm." The time in minutes required for the mixture to rise from a value of 150° F. to the Peak Exotherm was determined as the rate of cure.

In all tests a standard copolymerizable mixture of 1 part by weight of styrene and 2 parts by weight of a mixed polyester, which was of 2.2 mols 1,2-propylene glycol, 1 mol maleic acid and 1 mol phthalic acid, was employed.

The data from the several tests are tabulated as follows:

| The Inhibitor Compound | Test A — No catalyst 150° F., Time in days | Test B — Benzoyl peroxide, Time in hours, 77° F. | Test C — .1% t-butyl hydroperoxide, 77° F., Time in hours | Test D — .5% t-butyl hydroperoxide, 77° F., Time in hours | Test E — Benzoyl peroxide bath, 180° F., Time in minutes |
|---|---|---|---|---|---|
| .1% Diethyl amine hydrochloride | 7 | 17 | * | 2½ | 3.2 |
| .1% Tributyl amine hydrochloride | 7 | 17 | * | 3 | 3.0 |
| .1% Alpha naphthyl amine hydrochloride | 4 | 17 | * | 1½ | 2.4 |
| .1% Triamyl amine hydrochloride | 4 | 17 | * | 2¾ | 2.4 |
| 5.% Trimethyl benzyl ammonium hydroxide | 1.5 | * | * | * | * |
| .1% Hydroquinone | 8 | 192 | 216 | 192 | 29.3 |
| .1% 4-tertiary butyl catechol | 8 | 192 | 216 | 72 | 26.7 |
| .1% Catechol | 8 | 192 | 216 | 72 | 7.0 |
| .1% Ascorbic Acid | (1) | * | (1) | (1) | * |
| .1% Alpha naphthol | .5 | * | 60 | 34 | * |
| .1% Tertiary butyl catechol+.001% n-butyl amine | 9 | * | 216 | 72 | * |
| .1% Sulfur | 6 | * | 60 | 34 | * |
| .1% Benzaldehyde | 3 | * | 60 | 34 | * |
| .1% Di-β-naphtyhl p-phenylene diamine | 6 | 48-120 | 216 | 34 | 17.4 |

1 Gelled at once.

It will be appreciated that the copolymerizable mixture employed in the tests without the addition of inhibitor would gel almost immediately upon the combination of the polyester and the styrene or if gelation did not occur at once, such mixture would gel very quickly when heated to 150° F.

In the table, it will be observed that the mixtures which have been stabilized with hydrochlorides of amines, e. g. diethyl amine hydrochloride, are effectively stabilized even at relatively elevated temperatures. The stabilizers have but little effect upon the rate of cure of the copolymerizable mixtures after the catalysts of addition have been incorporated. It will be observed that the stabilized mixtures reach a peak exotherm when heated to a temperature of 150° F. within 3 or 4 minutes.

In contradistinction, those compositions containing conventional stabilizers such as hydroquinone or mixtures of tertiary butyl catechol and n-butyl amine are either incompletely stabilized under storage conditions or else they produce an excessive delay in the curing of the copolymerizable mixtures after the catalysts of copolymerization have been added. For example, in the case of hydroquinone, it is found that mixtures containing peroxide catalyst and .1% of the stabilizer will not gel except after several days' standing. This mixture would not be satisfactory for many casting operations where cure at a rapid rate and at relatively low temperatures is a requisite.

In the claims, the term "ester of ethylenically unsaturated acid" is intended to include mixed esters of the ethylenically unsaturated acid and other acids such as phthalic, succinic, adipic and other acids which contain no ethylenic unsaturation as well as the unmixed esters thereof.

The examples given herein are to be regarded merely as illustrating the principles of the invention. It will be apparent to those skilled in the art that numerous modifications may be made therein without departure from the spirit of the invention or the scope of the appended claims.

This application is a continuation in part of my prior applications Serial No. 598,639, filed June 9, 1945, Serial No. 630,551, filed November 23, 1945, and Serial No. 5,684, filed January 31, 1948, each now abandoned.

I claim:

1. A copolymerizable mixture comprising (A) an ethylenically unsaturated monomer, (B) a polyester of a dihydric alcohol and an alpha beta dicarboxylic, ethylenically unsaturated acid and (C) a small gelation inhibiting amount of a monoamine hydrohalide, said hydrohalide being soluble in the mixture.

2. A copolymerizable mixture comprising (A) an ethylenically unsaturated monomer, (B) a polyester of a dihydric alcohol and an alpha beta dicarboxylic, alpha ethenically unsaturated acid and (C) a small gelation inhibiting amount of a hydrohalide of a tertiary monoamine, said hydrohalide being soluble in the mixture.

3. As a new composition of matter a copolymerizable mixture of styrene and a polyester of a propylene glycol and maleic acid, said mixture containing in solution a small added inhibiting amount of a gelatin inhibitor which is a salt of a class consisting of trimethyl amine hydrohalide, triethyl amine hydrohalide, dimethyl anilone hydrohalide and pyridyl maleate.

4. A polymerizable mixture comprising a polyester of a glycol and an αβ ethylenically unsaturated, αβ dicarboxylic acid, said mixture further containing in solution therein a small added gelation inhibiting amount of dimethyl aniline hydrochloride.

5. The step as defined in claim 19 in which the salt is a halide of a tertiary amine.

6. The step as defined in claim 19 in which the salt is halide of a tertiary amine containing at least two alkyl groups.

7. The step as defined in claim 19 in which the salt is the halide of a trialkyl amine.

8. The step as defined in claim 19 in which the salt is the halide of a dialkyl aniline.

9. A polymerizable mixture comprising (A) a polymerizable polyester of a dihydric alcohol and a dicarboxylic ethenically unsaturated acid and (B) a small gelation inhibiting amount of a salt of a monoamine and an acid which is no stronger as an oxidizing agent than sulfuric acid and at least as strong in acid value as acetic acid, said salt being non-alkaline and soluble in the polyester.

10. A polymerizable mixture comprising (A) a polymerizable polyester of a dihydric alcohol and an alpha-beta dicarboxylic ethenically unsaturated acid and (B) a small gelation inhibiting amount of a salt of a tertiary amine and an acid which is no stronger as an oxidizing agent than sulfuric acid and which is at least as strong in acid value as acetic acid, said salt being soluble in the polyester.

11. A copolymerizable mixture comprising (A) a polymerizable polyester of a dihydric alcohol and an $\alpha\beta$ dicarboxylic ethenically unsaturated (B) an ethylenically unsaturated compound copolymerizable with the polyester and (C) a small gelation inhibiting amount of a salt of a monoamine, and an acid which is no stronger as an oxidizing agent than sulfuric acid and which is at least as strong in acid value as acetic acid, said salt being soluble in the mixture.

12. A copolymerizable mixture comprising (A) a polymerizable polyester of a glycol and an $\alpha\beta$ ethylenically unsaturated dicarboxylic acid and (B) a polymerizable compound containing the group $>C=CH_2$ and being copolymerizable with the unsaturated polyester and (C) a small gelation inhibiting amount of a salt of a tertiary mono-amine and an acid which is no stronger as an oxidizing agent than sulfuric acid and which is at least as strong as acid value is acetic acid, said salt being soluble in the mixture.

13. A polymerizable mixture comprising (A) a polymerizable polyester of a dihydric alcohol and an $\alpha\beta$ dicarboxylic ethylenically unsaturated acid, (B) an ethylenically unsaturated compound containing the group $>C=CH_2$ and being soluble in and copolymerizable with said polyester and (C) a small gelation inhibiting amount of a non-alkaline halide salt of an amine, said salt being soluble in the mixture.

14. A polymerizable mixture comprising (A) a polyester of a dihydric alcohol and an $\alpha\beta$ dicarboxylic ethylenically unsaturated acid, (B) an ethylenically unsaturated compound containing the group $>C=CH_2$ and being soluble in and copolymerizable with said polyester and (C) a small gelation inhibiting amount of a non-alkaline hydrohalide salt of a tertiary monoamine, said salt being soluble in the polyester.

15. In a method of stabilizing a polyester of glycol and an esterifiable acid of a class consisting of an $\alpha\beta$ ethylenically unsaturated dicarboxylic acid and a mixture of said acid and a dicarboxylic acid which is free of ethylenic unsaturation, the steps of dissolving in the mixture a small, gelation inhibiting amount of a non-alkaline salt of an amine and an acid which is no stronger as an oxidizing agent than sulfuric acid and at least as strong in acid value as acetic acid, said salt being soluble in the mixture and added to the polyester while the latter is heated to a temperature adequate to effect ready solution, but below that of decomposition of the salt, and then cooling the mixture to storage temperature.

16. A polymerizable mixture comprising (A) styrene (B) a polymerizable polyester of a dihydric alcohol and maleic acid and (C) a small gelation inhibiting amount of a tertiary hydrocarbon amine hydrochloric which is soluble in the mixture.

17. A polymerizable mixture of (A) a polyester of a dihydric alcohol consisting of carbon hydrogen and oxygen and an $\alpha\beta$ ethylenically unsaturated $\alpha\beta$ dicarboxylic acid and (B) an alphabeta ethylenically unsaturated aralkene compound soluble in and copolymerizable with the polyester and containing a $>C=CH_2$ group, said mixture further containing in solution (C) a small gelation-inhibiting amount of a non-alkaline halide salt of a monoamine in which one to three of the hydrogen atoms of the nitrogen are replaced by saturated hydrocarbon groups.

18. In a method of preparing a copolymerizable mixture of (A) a polyester of a dihydric alcohol consisting of carbon, hydrogen and oxygen and an alpha-beta ethylenically unsaturated alpha-beta dicarboxylic acid and (B) an ethylenically unsaturated compound containing the group $>C=CH_2$ and being soluble in and copolymerizable with said polyester, the step of dissolving in the polyester prior to the addition of the monomer, a small gelation-inhibiting amount of a non-alkaline hydrohalide salt of a tertiary monoamine, said salt being soluble in the polyester, and subsequently adding to the polyester said compound containing the $>C=CH_2$ group.

19. In a method of preventing premature gelation of a copolymerizable mixture of (A) a polyester of a dihydric alcohol consisting of carbon, hydrogen and oxygen and an alpha-beta ethylenically unsaturated, alpha-beta dicarboxylic acid and (B) an alpha-beta ethylenically unsaturated aralkene compound soluble in, and copolymerizable with, the polyester and containing a $>C=CH_2$ group, the step of dissolving in the mixture a small gelation-inhibiting amount of a non-alkaline hydrohalide salt of a monoamine in which 1 to 3 of the hydrogen atoms attached to the nitrogen are replaced by saturated hydrocarbon groups.

EARL E. PARKER.

References Cited in the file of this patent

UNITED STATES PATENTS

| Number | Name | Date |
|---|---|---|
| 2,225,471 | Foord | Dec. 17, 1940 |
| 2,299,128 | Codd | Oct. 20, 1942 |
| 2,407,861 | Wolk | Sept. 17, 1946 |
| 2,409,633 | Kropa | Oct. 22, 1946 |
| 2,452,669 | Levine | Nov. 2, 1948 |
| 2,480,928 | Hurdis | Sept. 6, 1949 |

FOREIGN PATENTS

| Number | Country | Date |
|---|---|---|
| 540,167 | Great Britain | Oct. 8, 1941 |